(12) United States Patent
Bahar et al.

(10) Patent No.: US 11,552,320 B2
(45) Date of Patent: Jan. 10, 2023

(54) ANION EXCHANGE POLYMERS AND ANION EXCHANGE MEMBRANES FOR DIRECT AMMONIA FUEL CELLS

(71) Applicant: Xergy Inc, Harrington, DE (US)

(72) Inventors: Bamdad Bahar, Georgetwon, DE (US); Taoli Gu, Harrington, DE (US)

(73) Assignee: FFI IONIX IP, INC., Wilmington, DE (US)

( * ) Notice: Subject to any disclaimer, the term of this patent is extended or adjusted under 35 U.S.C. 154(b) by 247 days.

(21) Appl. No.: 16/789,346

(22) Filed: Feb. 12, 2020

(65) Prior Publication Data
US 2021/0320315 A1 Oct. 14, 2021

Related U.S. Application Data

(60) Provisional application No. 62/804,634, filed on Feb. 12, 2019.

(51) Int. Cl.
*H01M 8/1023* (2016.01)
*H01M 8/22* (2006.01)
(Continued)

(52) U.S. Cl.
CPC .......... *H01M 8/1023* (2013.01); *B01J 41/13* (2017.01); *C08G 61/10* (2013.01); *H01M 8/1051* (2013.01);
(Continued)

(58) Field of Classification Search
CPC ............. H01M 8/1023; H01M 8/1051; H01M 8/1053; H01M 8/1058; H01M 8/222;
(Continued)

(56) References Cited

U.S. PATENT DOCUMENTS

2011/0195323 A1* 8/2011 Inoue ................. H01M 8/0668
429/410

FOREIGN PATENT DOCUMENTS

WO   WO-2019068051 A2 * 4/2019 ............ B01J 41/14

OTHER PUBLICATIONS

Lee et al., Robust Hydroxide Ion Conducting Poly(biphenyl alkylene)s for Alkaline Fuel Cell Membranes, ACS Macor Lett, 2015, 4, 814-818 (Year: 2015).*

(Continued)

*Primary Examiner* — Helen Oi K Conley
(74) *Attorney, Agent, or Firm* — Invention To Patent Services; Alex Hobson

(57) ABSTRACT

An anion exchange polymer includes aryl ether linkage free polyarylenes having aromatic/polyaromatic rings in polymer backbone and a tethered alkyl quaternary ammonium hydroxide side groups. This anion exchange polymer may be utilized in an anion exchange process and may be made into a thin anion transfer membrane. An ion transfer membrane may be mechanically reinforced having one or more layers of functional polymer based on a terphenyl backbone with quaternary ammonium functional groups and an inert porous scaffold material for reinforcement. An anion exchange membrane may have multilayers of anion exchange polymers which each containing varying types of backbones, varying degrees of functionalization, or varying functional groups to reduce ammonia crossover through the membrane.

14 Claims, 5 Drawing Sheets

(51) Int. Cl.
  *H01M 8/1053* (2016.01)
  *H01M 8/1058* (2016.01)
  *H01M 8/1051* (2016.01)
  *B01J 41/13* (2017.01)
  *C08G 61/10* (2006.01)
  *H01M 8/10* (2016.01)

(52) U.S. Cl.
  CPC ....... *H01M 8/1053* (2013.01); *H01M 8/1058* (2013.01); *H01M 8/222* (2013.01); *C08G 2261/146* (2013.01); *C08G 2261/149* (2013.01); *C08G 2261/312* (2013.01); *H01M 2008/1095* (2013.01); *H01M 2300/0082* (2013.01)

(58) Field of Classification Search
  CPC ... H01M 2008/1095; H01M 2300/0082; B01J 41/13; B01J 47/12; C08G 61/10; C08G 2261/146; C08G 2261/149; C08G 2261/312; C08G 10/00; Y02E 60/50
  See application file for complete search history.

(56) References Cited

OTHER PUBLICATIONS

Lee' et al., Poly(terphenylene) Anion Exchange Membranes: The effect of Backbone Structure on Morphology and Membrane Property, ACS Macro Lett. 2017, 6, 566-570 (Year: 2017).*

Noh et al., Molecular Engineering of Hydroxide Conducting Polymers for Anion Exchange Membranes in Electrochemical Energy Conversion Technology, Acc. Chem. Res. 2019, 52, 2745-2755 (Year: 2019).*

* cited by examiner

ANION EXCHANGE POLYMERS AND ANION EXCHANGE MEMBRANES FOR DIRECT AMMONIA FUEL CELLS

CROSS REFERENCE TO RELATED APPLICATIONS

This application claims the benefit of priority to U.S. provisional patent application No. 62/804,634, filed on Feb. 12, 2019; the entirety of which is hereby incorporated by reference herein.

BACKGROUND OF THE INVENTION

Field of the Invention

This invention is directed to unique anion exchange polymers and anion exchange membranes incorporating these polymers for its application in fuel cells especially direct ammonia fuel cells.

Background

Anion exchange membranes (AEMs) in fuel cells are solid polymer electrolyte membranes which transport anions (e.g. $OH^-$, $HCO_3^-$) under an electrical potential. AEM is a critical component for direct ammonia fuel cells (DAFCs), where ammonia and oxygen are used to generate electricity together with nitrogen as a byproduct. Ammonia is an ideal carbon-free fuel for fuel cells and offers a reliable and clean source of energy, without many of the problems associated with the traditional hydrogen economy. Compared to proton exchange membrane fuel cells, DAFCs have attracted recent interest due to their potential to eliminate the requirement for expensive platinum-group catalysts, fluorinated ionomers, and acid-resistant metals in the system. The chemical reactions in DAFC are as follows:

Cathode: $O_2 + 2H_2O + 4e^- \rightarrow 4OH^-$  (1)

Anode: $2NH_3 + 6OH^- \rightarrow N_2 + 6H_2O + 6e^-$  (2)

Overall: $4NH_3 + 3O_2 \rightarrow 2N_2 + 6H_2O$  (3)

To achieve high ionic conductivity and hydrophilic-domain phase separation, AEMs for DAFCs are designed to have high ion exchange capacity (IEC). High IEC also increases the water uptake and reduces the mechanical strength and dimensional stability in AEMs. To solve these issues, thicker membranes are traditionally used. However, thicker AEMs have higher ionic resistance, lowering the electrochemical performance in a device. To achieve a thin, dimensionally-stable AEM with low resistance, inert reinforcement must be explored.

However, a critical issue with thin AEMs is fuel (in the case of a DAFC, i.e. ammonia) crossover across the membrane during operation. Crossover results in both degradation of the membrane and reduced cell performance in terms of open circuit voltage and efficiency. Crossover in an electrochemical cell is often characterized by electrochemical methods and is described as a crossover current density. For low temperature DAFC based on polymeric membrane electrolytes, the real challenge is how to minimize the crossover of ammonia. Novel chemical and coating structure design for anion exchange polymer and AEM become the key for its application in DAFCs.

In the case of anion exchange polymers, various cationic functional groups grafted to the same polymer backbone can exhibit various degrees of fuel crossover and/or ionic conductivity. For example, an anion exchange polymer may contain a tetramethylammonium functional group to provide certain anion exchange capacity. Substitution of this functional group with a pyridinium or piperidinium functional group may result in varying ammonia crossover and/or ionic conductivity. Besides, various polymer backbone and molecular weight can also exhibit various degrees of ammonia crossover. In the case of AEM, multilayer structure design will also result in reducing ammonia crossover.

The anion conducting membrane may be made much thinner and durable with the use of a microporous support scaffold, wherein the anion polymer is coated onto or at least partially into the microporous support scaffold. A microporous support scaffold may be microporous polyethylene, polypropylene, and polytetrafluoroethylene, such as expanded polytetrafluoroethylene (ePTFE) membrane, for example. An ion conducting membrane and the microporous support scaffold may be any suitable thickness including about 20 microns or less, and preferably 10 microns or less, and even more preferably about 5 microns or less.

There is therefore an urgent need for inexpensive, chemically stable AEM to enable the performance and durability for developing fuel cells including DAFCs.

SUMMARY OF THE INVENTION

The present invention provides a mechanically reinforced anion exchange membrane comprising one or more layers of functional polymer based on a terphenyl backbone with quaternary ammonium functional groups and an inert porous scaffold material for reinforcement. Typically, the present invention describes an anion exchange membrane comprising multilayers of anion exchange polymers which each contain varying types of backbones, varying degrees of functionalization, or varying functional groups to reduce ammonia crossover through the membrane. Typically, the membrane consists of at least two layers with varying properties. Typically, the thickness of anion exchange membrane is 30 microns or less, more typically 15 microns or less, and in some embodiments 5 microns or less.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
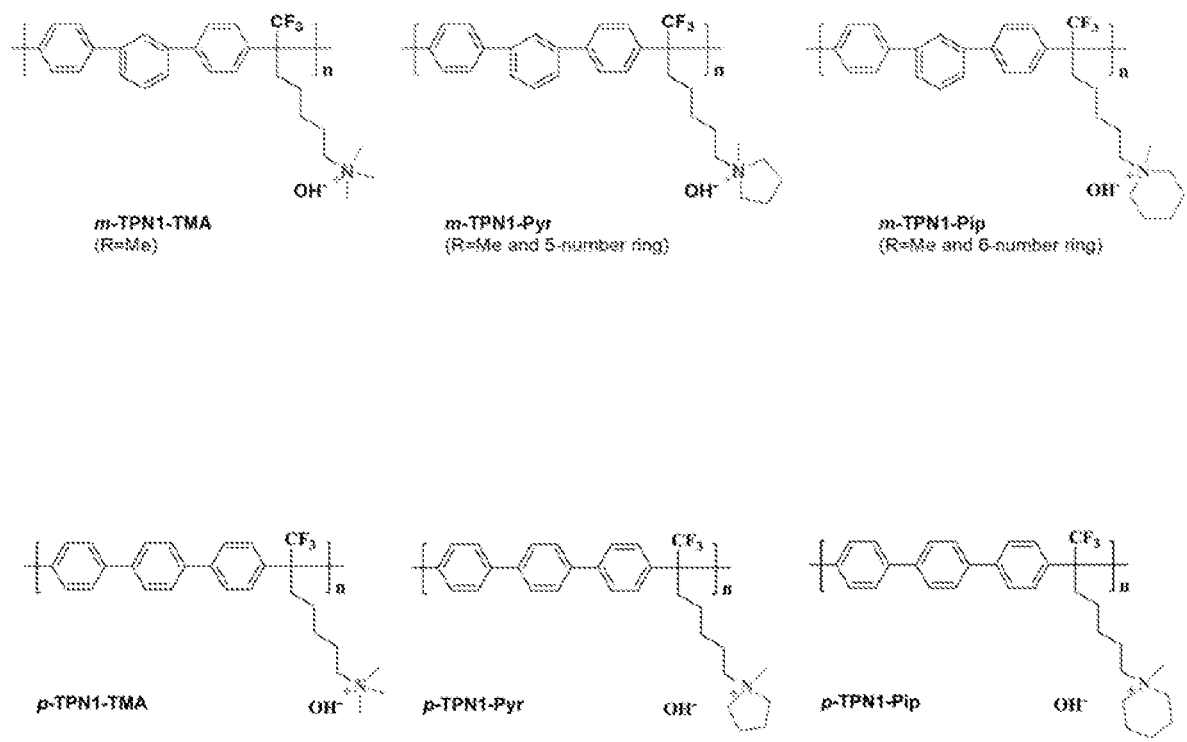
FIG. 1 shows representative examples of anion exchange polymers disclosed in this invention

The summary of the invention is provided as a general introduction to some of the embodiments of the invention, and is not intended to be limiting. Additional example embodiments including variations and alternative configurations of the invention are provided herein.

DETAILED DESCRIPTION OF THE ILLUSTRATED EMBODIMENTS

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Anion exchange polymers described in this invention is composed of an aromatic/polyaromatic ring in polymer backbone (e.g. biphenyl, terphenyl, fluorenyl) and a tethered alkyl halide (e.g. bromide) side chain which can be converted to quaternary ammonium hydroxide groups.

In one embodiment, a membrane is prepared by dissolving p-TPN1-Pyr in DMF at a 10% weight ratio i.e. 0.3 grams of polymer to 9.7 g of solvent. The mixture was stirred until homogenous and translucent.

The anion exchange polymer solution was then applied to a microporous polyethylene material tensioned around a chemically-resistant plastic frame. The polymer solution was then poured on to the microporous scaffold. The frame was covered with a lid to slow down the solvent evaporation process. The membrane was dried at 60-degree C. The final thickness of the anion exchange membrane was 15 microns.

In another embodiment, a membrane is prepared by dissolving p-TPN1-TMA in DMF at an 8% weight ratio i.e. 0.8 grams of polymer to 9.2 g of solvent. The mixture was stirred until homogenous and translucent.

The anion exchange polymer was then applied to a microporous poly(tetrafluoroethylene) material with a doctor blade. The membrane was dried at room temperature. The final thickness of the membrane was 6 microns.

In another embodiment, a membrane is prepared by providing two distinct solutions of TPN polymers of various functional groups in DMF (e.g. m-TPN1-TMA and m-TPN1-Pip) along with a porous reinforcement material. The porous reinforcement material is coated on one side with the first solution with a doctor blade and then dried. Then, the porous reinforcement material is coated on the second side with the second solution and then dried, filling the remainder of the pores in the reinforcement material and creating a multilayer reinforced anion exchange membrane. The final thickness of the membrane was 10 microns.

It will be apparent to those skilled in the art that all the embodiment discussed above can be scaled up to a roll-to-roll continuous coating process.

Figure 2:
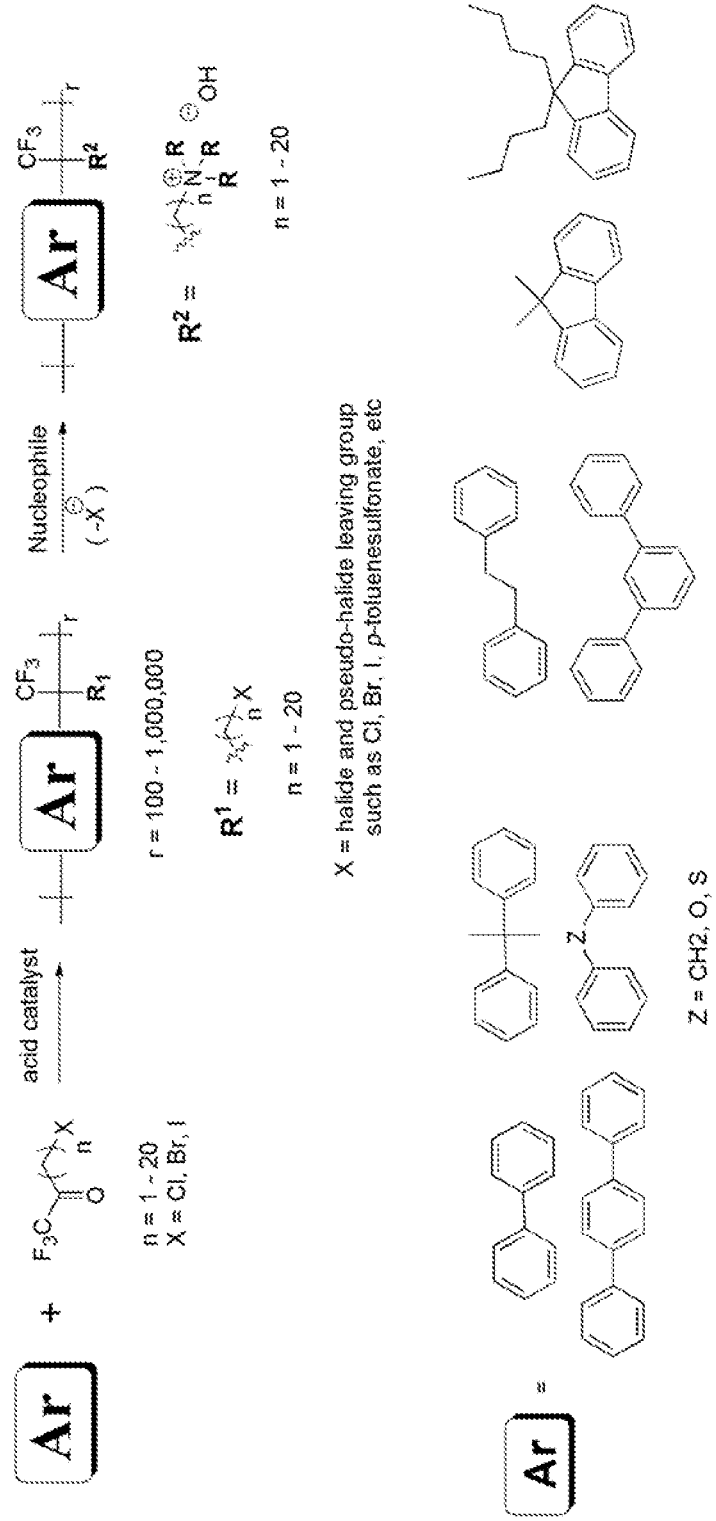
FIG. 2 shows representative examples of anion exchange polymers disclosed in this invention

FIGS. 1 and 2 shows the chemical structure of exemplary anion exchange polymers of the present invention.

Figure 3:
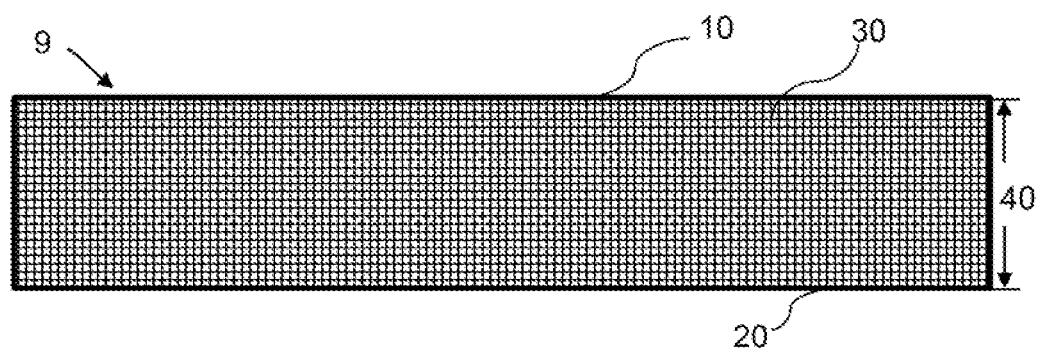
FIG. 3 shows an exemplary porous scaffold reinforcement material employed in the present invention.

FIG. 3 shows an exemplary cross-sectional diagram of porous scaffold 9 has a thickness 40 from a first side 10 and an opposite second side 20. The porous scaffold has pores 30 and an open structure from the first side 10 to the second side 20, allowing for an appropriate fluid to flow from the first to the second side. The porous scaffold is air permeable.

Figure 4:
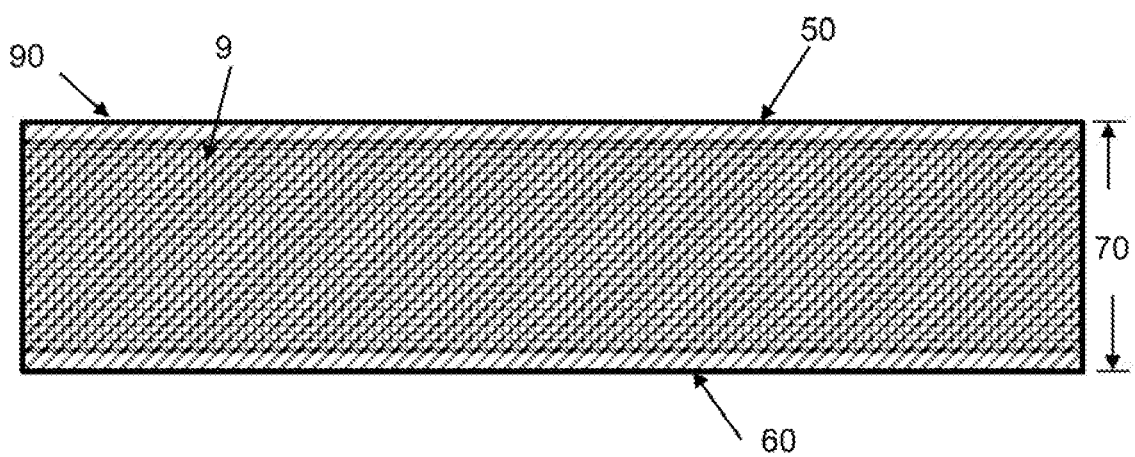
FIG. 4 shows an exemplary anion exchange membrane formed from imbibing an anion exchange polymer into a porous scaffold reinforcement material.

FIG. 4 shows a cross-sectional diagram of an anion exchange membrane 90 comprising a porous scaffold 9 imbibed with an anion exchange polymer 70 which contributes ionic conductivity. The anion exchange polymer forms surface layers 50 and 60 on the two faces of the imbibed porous scaffold.

Figure 5:
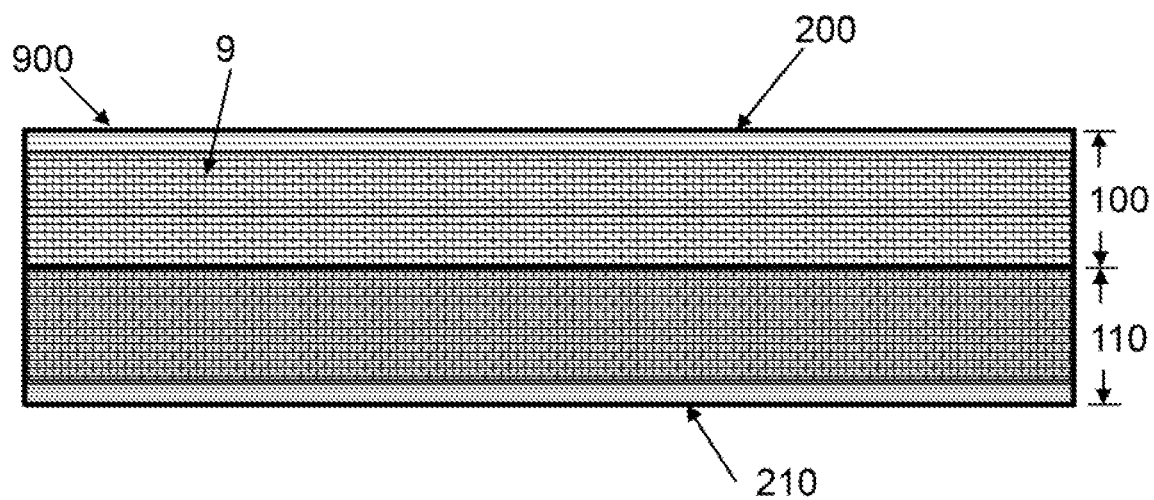
FIG. 5 shows an exemplary anion exchange membrane formed from imbibing two various anion exchange polymers into a porous scaffold reinforcement material.

FIG. 5 shows a multilayered anion exchange membrane 900 comprise a first layer 100 comprising an anion exchange polymer with a functional group 200 and a second layer 110 comprising another anion exchange polymer with a second functional group 210, both imbibed into the porous scaffold 9.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents

What is claimed is:

1. An anion membrane comprising an anion exchange polymer comprising:
   aryl ether linkage free polyarylenes comprising aromatic/polyaromatic rings in a polymer backbone and a tethered alkyl quaternary ammonium hydroxide side group;
   a first layer of anion exchange polymer having a first backbone, a first molecular weight and a first functional group;
   a second layer of anion exchange polymer having a second backbone, a second molecular weight and a second functional group; and
   wherein at least one of the second backbone, second molecular weight and second functional group are different than the first backbone, first molecular weight and first functional group;
   a first microporous support scaffold; and
   a second microporous support scaffold;
   wherein the first layer of anion exchange polymer is configured at least partially in the first microporous support scaffold, and wherein the second layer of anion exchange polymer is configured in the second microporous support scaffold.

2. The anion exchange membrane of claim 1, wherein the first microporous support scaffold and second microporous support scaffold are selected from the group consisting of: microporous polyethylene, polypropylene, and polytetrafluoroethylene.

3. The anion exchange membrane of claim 1, wherein the first layer of anion exchange polymer has meta-poly(triphenylene) or para-poly(triphenylene) backbone.

4. The anion exchange membrane of claim 3, wherein the second layer of anion exchange polymer has para-poly(triphenylene), or ortho-poly(triphenylene) backbone.

5. The anion exchange membrane of claim 1, wherein the first layer of anion exchange polymer has trimethylammonium or piperidinium function groups.

6. An anion exchange membrane comprising:
   an anion exchange polymer comprising aryl ether linkage free polyarylenes comprising aromatic/polyaromatic rings in a polymer backbone and a tethered alkyl quaternary ammonium hydroxide side group;
   a first layer of said anion exchange polymer having a first backbone, a first molecular weight and a first functional group;
   a second layer of anion exchange polymer and having a second backbone, a second molecular weight and a second functional group;
   wherein at least one of the second backbone, second molecular weight and second functional group are different than said first backbone, said first molecular weight and said first functional group;
   wherein the first layer of anion exchange polymer has trimethylammonium or piperidinium function groups; and
   wherein the second layer of anion exchange polymer has pyrrolidinium or piperidinium functional groups.

7. The anion exchange membrane of claim 1, wherein the first layer and second layer of anion exchange polymer are imbibed into said first microporous support scaffold and said second microporous support scaffold, respectively to create a reinforced anion exchange membrane.

8. The anion exchange membrane of claim 1, wherein the total thickness of the anion exchange membrane is less than 20 microns.

9. The anion exchange membrane of claim 1, wherein the total thickness of the anion exchange membrane is less than 5 microns.

10. The anion exchange membrane of claim 1, wherein the first layer of anion exchange polymer contains additives selected from the group consisting of: cerium(IV) oxide, silicon dioxide, graphene, carbon nanotube, and carbon black.

11. The anion exchange membrane of claim 1, wherein second layer of anion exchange polymer contains additives selected from the group consisting of: cerium(IV) oxide, silicon dioxide, graphene, carbon nanotube, and carbon black.

12. A direct ammonia fuel cell comprising an anion exchange membrane of claim 1.

13. The direct ammonia fuel cell of claim 12, wherein the anion exchange polymer is a TPN1.

14. The direct ammonia fuel cell of claim 12, wherein the fuel cell has a power density higher than 450 mW/cm 2.

* * * * *